(12) United States Patent
Cheng et al.

(10) Patent No.: US 7,856,220 B2
(45) Date of Patent: Dec. 21, 2010

(54) MAGNETO-ELECTRIC-INDUCTION CONVERSION SYSTEM OF WIRELESS INPUT DEVICE

(75) Inventors: Jen Kai Cheng, Taipei County (TW); Chien Lung Lu, Taipei County (TW); Chun Nan Hsien, Taipei County (TW); Yu Teng Wang, Taipei County (TW)

(73) Assignee: Kye Systems Corp., San Chung, Taipei (TW)

(*) Notice: Subject to any disclaimer, the term of this patent is extended or adjusted under 35 U.S.C. 154(b) by 421 days.

(21) Appl. No.: 12/213,507

(22) Filed: Jun. 20, 2008

(65) Prior Publication Data

US 2009/0231026 A1 Sep. 17, 2009

(30) Foreign Application Priority Data

Mar. 14, 2008 (TW) .............................. 97109158 A

(51) Int. Cl.
*H04B 1/10* (2006.01)
(52) U.S. Cl. .................... 455/302; 363/44; 333/172; 307/105
(58) Field of Classification Search ............... 363/17, 363/18, 19; 307/102, 105; 361/111, 708; 333/102–103, 214–215, 172, 178, 218; 455/302, 455/307, 313–323, 260–264
See application file for complete search history.

(56) References Cited

U.S. PATENT DOCUMENTS

| | | | | |
|---|---|---|---|---|
| 3,745,416 A | * | 7/1973 | Thanawala | 361/58 |
| 4,712,073 A | * | 12/1987 | Van Rumpt et al. | 327/119 |
| 5,519,386 A | * | 5/1996 | Tobergte | 340/10.34 |
| 5,684,341 A | * | 11/1997 | Steingroever | 307/16 |
| 5,777,864 A | * | 7/1998 | Seong et al. | 363/98 |
| 5,805,032 A | * | 9/1998 | Herbst et al. | 333/181 |
| 6,640,095 B2 | * | 10/2003 | Nakajima et al. | 455/323 |

* cited by examiner

*Primary Examiner*—Rajnikant B Patel
(74) *Attorney, Agent, or Firm*—Bacon & Thomas, PLLC

(57) ABSTRACT

A magneto-electric-induction conversion system of a wireless input device includes an emitter and a receiver. A plurality of serially-connected resonant circuits, arranged side by side, makes resonance, so transmission energy is enhanced. An electromagnetic wave is transmitted via an inductive antenna, then received and converted by predetermined parallel-connected resonant circuits into an available power source, so that the energy is effectively delivered.

20 Claims, 3 Drawing Sheets

MAGNETO-ELECTRIC-INDUCTION CONVERSION SYSTEM OF WIRELESS INPUT DEVICE

CROSS-REFERENCE TO RELATED APPLICATIONS

This non-provisional application claims priority under 35 U.S.C. §119(a) on Patent Application No(s). 097109158 filed in Taiwan, R.O.C. on Mar. 14, 2008 the entire contents of which are hereby incorporated by reference.

BACKGROUND OF THE INVENTION

1. Field of the Invention

The present invention relates to an energy converting device, and more particularly to a magneto-electric-induction conversion system of a wireless input device.

2. Related Art

Recently, in a power source of a common wireless device, a cell or rechargeable cell is mainly installed. The rechargeable cell can be reused after being recharged, so it has gradually become one of the main electrical sources for the wireless device. However, the wireless device installed with the rechargeable cell must be charged frequently, which is inconvenient in usage, such that a technique of wireless power supply is developed, so as to use the wireless device more conveniently.

The technique of wireless power supply is achieved by using electromagnetic induction, the principle is that a current is input into a coil, so the coil generates a magnetic field, and then the magnetic field affects another coil, and accordingly, another coil also generates a current. Therefore, when an energy sender transfers a current to an inductive antenna, the inductive antenna generates an electromagnetic field and emits an electromagnetic wave, the electromagnetic wave passes through the air and is transmitted to an internal inductive antenna of a wireless device, so as to generate an induction current, and finally, the induction current is converted into a stable current through a circuit in the wireless device.

However, the distance of energy transmission by using the electromagnetic wave is quite limited, and the energy converting efficiency is rather low. The efficiency for charging the rechargeable cell by using the wireless power supply is not as high as that of the wired power supply, so the current wireless power supply technique still has the problems of a short energy transmission distance, low energy-converting efficiency, and waste of energy, etc.

SUMMARY OF THE INVENTION

In order to solve the problems in the conventional art, the present invention provides a magneto-electric-induction conversion system of a wireless input device, so as to solve the problems of the conventional art, such as a short energy transmission distance through using wireless power supply, low energy-converting efficiency, and wastes of energy, etc.

In the magneto-electric-induction conversion system of the wireless input device according to the present invention, a plurality of serially-connected resonant circuits, arranged side by side, makes resonances, so the transmission energy is enhanced. An electromagnetic wave is transmitted via an inductive antenna, received and converted into an available power through a predetermined parallel-connected resonant circuit, such that the energy is effectively delivered, a higher converting efficiency is achieved, and the energy is further saved. At the receiving end, a plurality of parallel-connected resonant circuits may be disposed and sequentially connected in series, so as to improve the induction energy.

According to an embodiment of the present invention, a magneto-electric-induction conversion system of a wireless input device includes an emitter and a receiver. The emitter includes an oscillation circuit, a first phase-inverting circuit, a second phase-inverting circuit, and at least two serially-connected resonant circuits. The receiver includes at least one parallel-connected resonant circuit and a rectifier circuit.

The oscillation circuit generates an oscillation signal by oscillating at a specific frequency. The first phase-inverting circuit and the oscillation circuit are connected in series, for inverting the oscillation signal and outputting a first alternating current (AC) signal having a first phase. The second phase-inverting circuit and the first phase-inverting circuit are connected in series, for inverting the first AC signal and outputting a second AC signal having a second phase. At least two serially-connected resonant circuits are arranged side by side, and each serially-connected resonant circuit is connected to the second phase-inverting circuit in parallel, for receiving the first AC signal and the second AC signal, and generating an electromagnetic wave according to the first AC signal and the second AC signal. At least one parallel-connected resonant circuit is used to generate an AC signal in response to the electromagnetic wave emitted from the serially-connected resonant circuit. When a plurality of parallel-connected resonant circuits exists, the parallel-connected resonant circuits are connected in series. The rectifier circuit is electrically connected to at least one parallel-connected resonant circuit, for converting the AC signal into a direct current (DC) signal and outputting the DC signal.

Each serially-connected resonant circuit includes an inductive antenna, a matching capacitor, a first phase-inverting unit, and a second phase-inverting unit. One end of the matching capacitor is electrically connected to one end of the inductive antenna, an output end of the first phase-inverting unit is electrically connected to the other end of the matching capacitor, and an output end of the second phase-inverting unit is electrically connected to the other end of the inductive antenna. Each parallel-connected resonant circuit includes an inductive antenna and a matching capacitor that are mutually connected in parallel.

To sum up, through the technical means of the present invention, a plurality of serially-connected resonant circuits, arranged side by side, is disposed at an emitting end, so as to enhance the transmission energy by resonation, and the electromagnetic wave is transmitted via the inductive antenna; at the receiving end, the parallel-connected resonant circuits are used to receive the electromagnetic wave, so as to convert the electromagnetic wave into the available power, thereby effectively delivering the energy. Furthermore, a plurality of parallel-connected resonant circuits, sequentially connected in series, is disposed at the receiving end, so as to enhance the induction energy, thereby further effectively delivering the energy.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
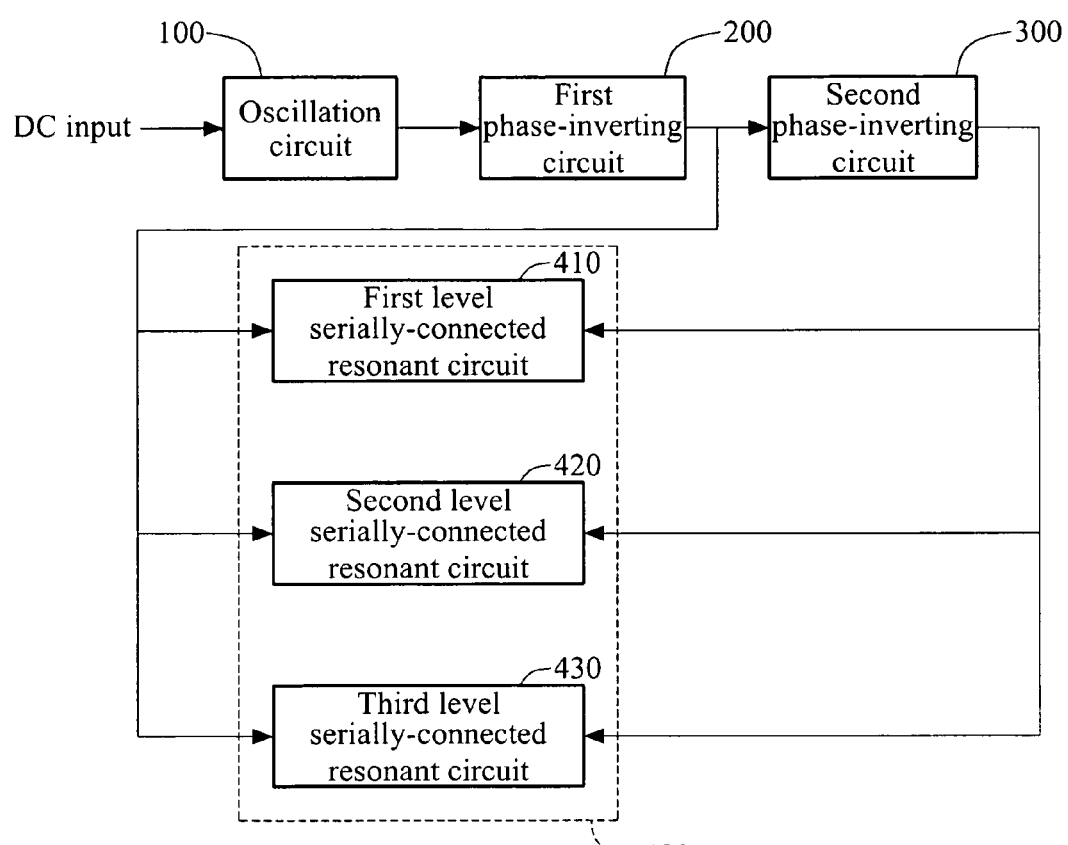
FIG. 1 is a general block diagram of a magneto-electric-induction conversion emitter of a wireless input device according to an embodiment of the present invention.

Referring to FIG. 1, it is a general block diagram for a circuit of a magneto-electric-induction conversion emitter of a wireless input device according to an embodiment of the present invention. As shown in FIG. 1, a magneto-electric-induction conversion emitter of a wireless input device includes an oscillation circuit 100, a first phase-inverting circuit 200, a second phase-inverting circuit 300, and at least two serially-connected resonant circuits 400.

The oscillation circuit 100 and the first phase-inverting circuit 200 are connected in series. The first phase-inverting circuit 200 and the second phase-inverting circuit 300 are connected in series. At least two serially-connected resonant circuits 400 are arranged side by side, and each serially-connected resonant circuit 400 is connected to the second phase-inverting circuit 300 in parallel.

The oscillation circuit 100 is used to generate an oscillation signal by oscillating at a specific frequency. The first phase-inverting circuit 200 is used for inverting the oscillation signal and outputting a first AC signal having a first phase. The second phase-inverting circuit 300 is used for inverting the first AC signal and outputting a second AC signal having a second phase. At least two serially-connected resonant circuits 400 are used to receive the first AC signal and the second AC signal, and to generate an electromagnetic wave according to the first AC signal and the second AC signal.

According to an embodiment of the present invention, at least two serially-connected resonant circuits 400 include a first level serially-connected resonant circuit 410, a second level serially-connected resonant circuit 420, and a third level serially-connected resonant circuit 430.

The first level serially-connected resonant circuit 410, the second level serially-connected resonant circuit 420, and the third level serially-connected resonant circuit 430 are all connected to the second phase-inverting circuit 300 in parallel, and they are arranged side by side.

The first level serially-connected resonant circuit 410, the second level serially-connected resonant circuit 420, and the third level serially-connected resonant circuit 430 all receive the first AC signal and the second AC signal, and generate an electromagnetic wave by making resonance among each other according to the first AC signal and the second AC signal.

Figure 2:
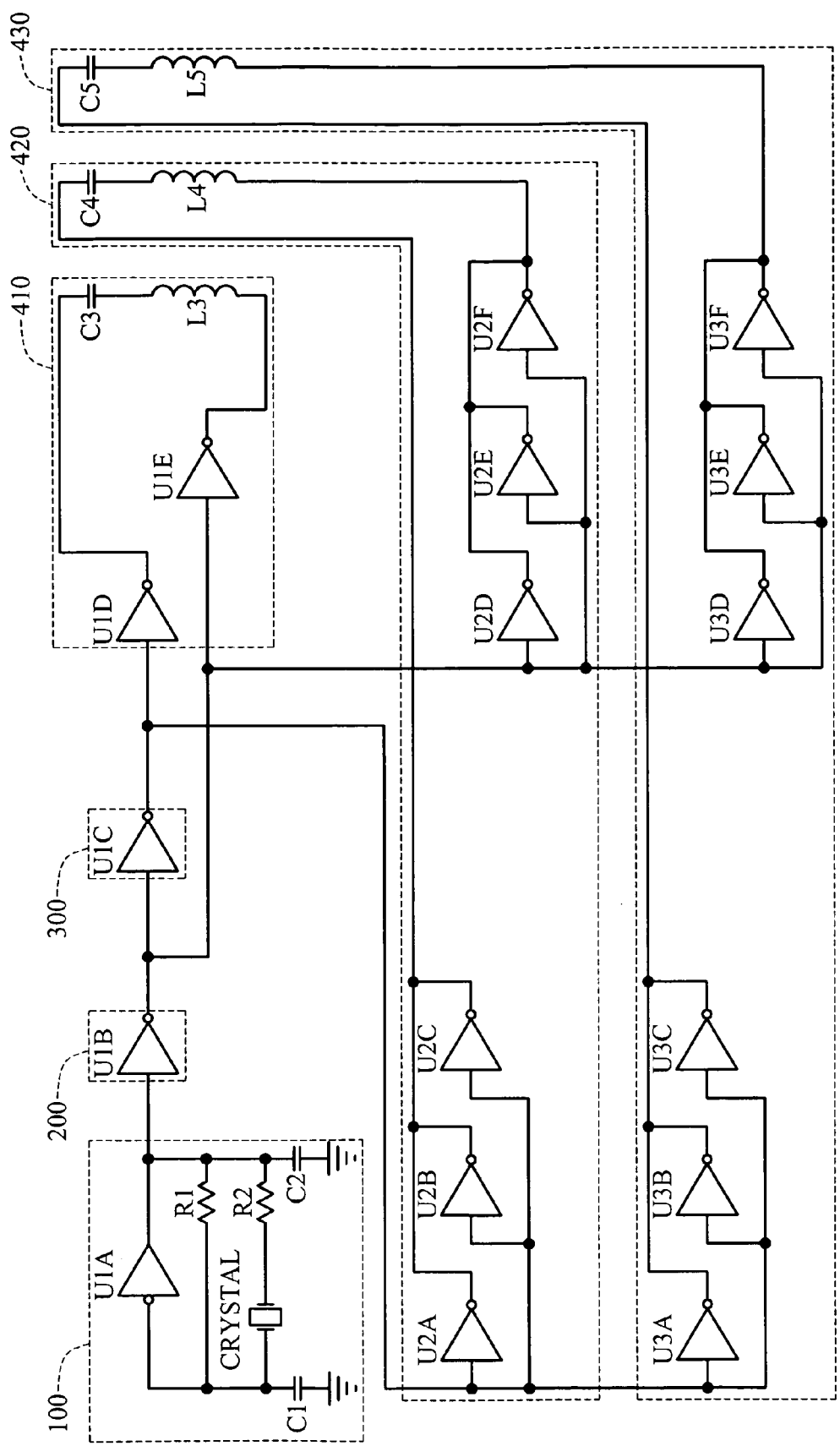
FIG. 2 is a circuit diagram of the magneto-electric-induction conversion emitter of the wireless input device according to an embodiment of the present invention.

Referring to FIG. 2, it is a circuit diagram of the magneto-electric-induction conversion emitter of the wireless input device according to an embodiment of the present invention. Referring to FIG. 2, the oscillation circuit 100 includes an oscillator CRYSTAL, a first capacitor C1, a second capacitor C2, a first resistor R1, a second resistor R2, and a first inverter U1A.

One end of the first capacitor C1 is grounded, and the other end of the first capacitor C1 is electrically connected to one end of the oscillator CRYSTAL. One end of the first resistor R1 is electrically connected to an input end of the first inverter U1A, and the other end of the first resistor R1 is electrically connected to an output end of the first inverter U1A. The other end of the oscillator CRYSTAL is electrically connected to one end of the second resistor R2. One end of the second capacitor C2 is grounded, and the other end of the second capacitor C2 is electrically connected to the other end of the second resistor R2.

The oscillation circuit 100 receives an AC input, and generates an oscillation signal by oscillating at a specific frequency. The oscillation circuit 100 may be a quartz oscillation circuit, which is only taken as an example for demonstration, but not to limit the present invention.

The first phase-inverting circuit 200 includes a second inverter U1B.

The first phase-inverting circuit 200 and the oscillation circuit 100 are connected in series, and the output end of the first inverter U1A is electrically connected to an input end of the second inverter U1B.

The first phase-inverting circuit 200 inverts the oscillation signal, and outputs a first AC signal having a first phase.

The second phase-inverting circuit 300 includes a third inverter U1C.

The second phase-inverting circuit 300 and the first phase-inverting circuit 200 are connected in series, and the output end of the second inverter U1B is electrically connected to an input end of the third inverter U1C.

The second phase-inverting circuit 300 is used to invert the first AC signal, and outputs a second AC signal having a second phase.

The first phase and the second phase are opposite to each other, for example, the first phase is 0°, and the second phase is 180°.

Here, when the first phase-inverting circuit 200 outputs a high potential, the second phase-inverting circuit 300 outputs a low potential. On the contrary, when the first phase-inverting circuit 200 outputs a low potential, the second phase-inverting circuit 300 outputs a high potential. In other words, the outputs of the first phase-inverting circuit 200 are alternated with that of the second phase-inverting circuit 300.

The first level serially-connected resonant circuit 410 includes a third inductive antenna L3, a third matching capacitor C3, a first phase-inverting unit, and a second phase-inverting unit. The first phase-inverting unit of the first level serially-connected resonant circuit 410 includes a fourth inverter U1D. The second phase-inverting unit of the first level serially-connected resonant circuit 410 includes a fifth inverter U1E.

The first level serially-connected resonant circuit 410 is connected to the second phase-inverting circuit 300 in parallel, an input end of the fourth inverter U1D is electrically connected to an output end of the third inverter U1C, an output end of the fourth inverter U1D is electrically connected to one end of the third matching capacitor C3, the other end of the third matching capacitor C3 is electrically connected to one end of the third inductive antenna L3, the other end of the third inductive antenna L3 is electrically connected to an output end of the fifth inverter U1E, and an input end of the fifth inverter U1E is electrically connected to the input end of the third inverter U1C.

The first level serially-connected resonant circuit 410 is used to receive the first AC signal and the second AC signal, and to generate an electromagnetic wave according to the first AC signal and the second AC signal.

The second level serially-connected resonant circuit 420 includes a fourth inductive antenna L4, a fourth matching capacitor C4, a first phase-inverting unit, and a second phase-inverting unit. The first phase-inverting unit of the second level serially-connected resonant circuit 420 includes a sixth inverter U2A, a seventh inverter U2B, and an eighth inverter U2C. The second phase-inverting unit of the second level serially-connected resonant circuit 420 includes a ninth inverter U2D, a tenth inverter U2E, and an eleventh inverter U2F.

The second level serially-connected resonant circuit 420 is connected to the second phase-inverting circuit 300 in parallel; the sixth inverter U2A, the seventh inverter U2B, and the eighth inverter U2C are mutually connected in parallel in the same direction; and the ninth inverter U2D, the tenth inverter U2E, and the eleventh inverter U2F are mutually connected in parallel in the same direction. An input end of the first phase-inverting unit of the second level serially-connected resonant circuit 420 is electrically connected to the output end of the third inverter U1C, an output end of the first phase-inverting unit of the second level serially-connected resonant circuit 420 is electrically connected to one end of the fourth matching capacitor C4, the other end of the fourth matching capacitor C4 is electrically connected to one end of the fourth inductive antenna L4, the other end of the fourth inductive antenna L4 is electrically connected to an output end of the second phase-inverting unit of the second level serially-connected resonant circuit 420, and an input end of the second phase-inverting unit of the second level serially-connected resonant circuit 420 is electrically connected to the input end of the third inverter U1C.

The second level serially-connected resonant circuit 420 is used to receive the first AC signal and the second AC signal, and to generate an electromagnetic wave according to the first AC signal and the second AC signal.

The third level serially-connected resonant circuit 430 includes a fifth inductive antenna L5, a fifth matching capacitor C5, a first phase-inverting unit, and a second phase-inverting unit. The first phase-inverting unit of the third level serially-connected resonant circuit 430 includes a twelfth inverter U3A, a thirteenth inverter U3B, and a fourteenth inverter U3C. The second phase-inverting unit of the third level serially-connected resonant circuit 430 includes a fifteenth inverter U3D, a sixteenth inverter U3E, and a seventeenth inverter U3F.

The third level serially-connected resonant circuit 430 is connected to the second phase-inverting circuit 300 in parallel; the twelfth inverter U3A, the thirteenth inverter U3B, and the fourteenth inverter U3C are mutually connected in parallel in the same direction; and the fifteenth inverter U3D, the sixteenth inverter U3E, and the seventeenth inverter U3F are mutually connected in parallel in the same direction. An input end of the first phase-inverting unit of the third level serially-connected resonant circuit 430 is electrically connected to the output end of the third inverter U1C, an output end of the first phase-inverting unit of the third level serially-connected resonant circuit 430 is electrically connected to one end of the fifth matching capacitor C5, the other end of the fifth matching capacitor C5 is electrically connected to one end of the fifth inductive antenna L5, the other end of the fifth inductive antenna L5 is electrically connected to an output end of the second phase-inverting unit of the third level serially-connected resonant circuit 430, and an input end of the second phase-inverting unit of the third level serially-connected resonant circuit 430 is electrically connected to the input end of the third inverter U1C.

The third level serially-connected resonant circuit 430 is used to receive the first AC signal and the second AC signal, and to generate an electromagnetic wave according to the first AC signal and the second AC signal. The first level serially-connected resonant circuit 410, the second level serially-connected resonant circuit 420, and the third level serially-connected resonant circuit 430 are arranged side by side, for making resonance and enhancing the energy transmission.

Figure 3:
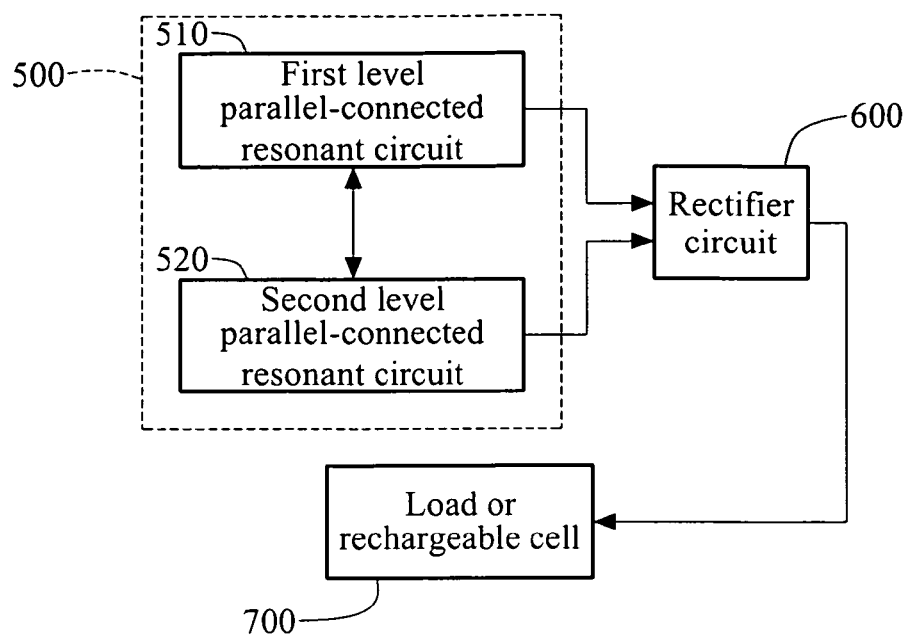
FIG. 3 is a general block diagram of a magneto-electric-induction conversion receiver of a wireless input device according to an embodiment of the present invention.

Referring to FIG. 3, it is a general block diagram for a circuit of a magneto-electric-induction conversion receiver of a wireless input device according to an embodiment of the present invention. Referring to FIG. 3, the magneto-electric-induction conversion receiver of the wireless input device includes at least one parallel-connected resonant circuit 500 and a rectifier circuit 600.

The parallel-connected resonant circuit 500 is electrically connected to the rectifier circuit 600. The rectifier circuit 600 is further electrically connected to a load or a rechargeable cell 700. A single parallel-connected resonant circuit 500 may be disposed here for receiving signals, and a plurality of parallel-connected resonant circuits 500, arranged side by side, may be disposed, so as to enhance the induction energy.

The parallel-connected resonant circuit 500 generates an AC signal in response to the electromagnetic wave emitted from the serially-connected resonant circuit 400. Furthermore, the rectifier circuit 600 converts the AC signal into a DC signal and outputs the DC signal to the subsequently disposed electronic device.

According to this embodiment of the present invention, at least one parallel-connected resonant circuit 500 includes a first level parallel-connected resonant circuit 510 and a second level parallel-connected resonant circuit 520.

The first level parallel-connected resonant circuit 510 and the second level parallel-connected resonant circuit 520 are mutually connected in series.

The first level parallel-connected resonant circuit 510 and the second level parallel-connected resonant circuit 520 are used to generate an AC signal in response to the electromagnetic wave emitted from the serially-connected resonant circuit 400.

Figure 4:
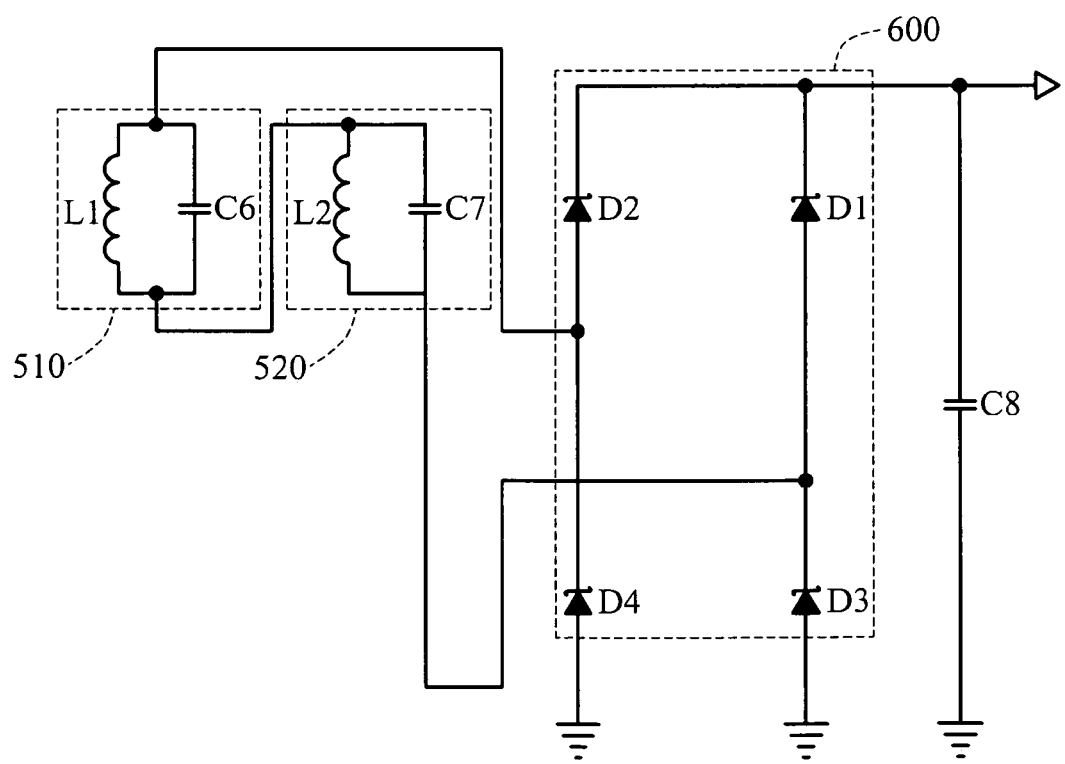
FIG. 4 is a circuit diagram of the magneto-electric-induction conversion receiver of the wireless input device according to an embodiment of the present invention.

Referring to FIG. 4, it is a circuit diagram of the magneto-electric-induction conversion receiver of the wireless input device according to an embodiment of the present invention. As shown in FIG. 4, the first level parallel-connected resonant circuit 510 includes a first inductive antenna L1 and a sixth matching capacitor C6.

The first inductive antenna L1 and the sixth matching capacitor C6 are connected in parallel.

The first level parallel-connected resonant circuit 510 is used to generate an AC signal in response to the electromagnetic wave emitted from the serially-connected resonant circuit 400.

The second level parallel-connected resonant circuit 520 includes a second inductive antenna L2 and a seventh matching capacitor C7.

The second inductive antenna L2 and the seventh matching capacitor C7 are connected in parallel.

The second level parallel-connected resonant circuit 520 is used to generate an AC signal in response to the electromagnetic wave emitted from the serially-connected resonant circuit 400.

The first level parallel-connected resonant circuit 510 and the second level parallel-connected resonant circuit 520 are connected in series.

In this embodiment of the present invention, the rectifier circuit 600 is a bridge rectifier circuit, which is merely taken as an example for demonstration, but not to limit the present invention.

The rectifier circuit 600 includes a first Schottky diode D1, a second Schottky diode D2 a third Schottky diode D3, and a fourth Schottky diode D4, in which an eighth capacitor C8 is further added for stabilizing the voltage.

One end of the first level parallel-connected resonant circuit 510 is electrically connected to one end of the second level parallel-connected resonant circuit 520, the other end of the first level parallel-connected resonant circuit 510 is electrically connected to an anode of the second Schottky diode D2 and a cathode of the fourth Schottky diode D4, an anode of the fourth Schottky diode D4 is grounded, a cathode of the second Schottky diode D2 is electrically connected to a cathode of the first Schottky diode D1 and one end of the eighth capacitor C8, an anode of the first Schottky diode D1 is electrically connected to the other end of the second level parallel-connected resonant circuit 520 and a cathode of the third Schottky diode D3, an anode of the third Schottky diode D3 is grounded, and the other end of the eighth capacitor C8 is grounded.

The rectifier circuit 600 is used to convert the AC signal into a DC signal, and to output the DC signal, in which the DC signal is output from an end where the cathode of the first Schottky diode D1 and the cathode of the second Schottky diode D2 are connected.

To sum up, through the technical means of the present invention, a plurality of serially-connected resonant circuits 400 is arranged side by side, so as to enhance the transmission energy by making resonation, and the electromagnetic wave is transmitted via the inductive antenna and received by the parallel-connected resonant circuit 500 and then converted into the available power. Furthermore, a plurality of parallel-connected resonant circuits, sequentially connected in series, is disposed at the receiving end, so as to enhance the induction energy, thereby further effectively delivering the energy, so as to solve the problems in the conventional art such as a short transmission distance and wastes of energy.

What is claimed is:

1. A magneto-electric-induction conversion system of a wireless input device, comprising:
    an emitter, comprising:
        an oscillation circuit, for generating an oscillation signal by oscillating at a specific frequency;
        a first phase-inverting circuit, connected to the oscillation circuit in series, for inverting the oscillation signal and outputting a first alternating current (AC) signal having a first phase;
        a second phase-inverting circuit, connected to the first phase-inverting circuit in series, for inverting the first AC signal and outputting a second AC signal having a second phase; and
        at least two serially-connected resonant circuits, arranged side by side, wherein each of the serially-connected resonant circuits is connected to the second phase-inverting circuit in parallel, for receiving the first AC signal and the second AC signal, and generating an electromagnetic wave according to the first AC signal and the second AC signal; and
    a receiver, comprising:
        at least one parallel-connected resonant circuit, for generating an AC signal in response to the electromagnetic wave emitted from the serially-connected resonant circuit; and
        a rectifier circuit, for converting the AC signal into a direct current (DC) signal, and outputting the DC signal.

2. The magneto-electric-induction conversion system of a wireless input device according to claim 1, wherein the oscillation circuit is a quartz oscillation circuit.

3. The magneto-electric-induction conversion system of a wireless input device according to claim 1, wherein each serially-connected resonant circuit comprises:
    an inductive antenna;
    a matching capacitor, wherein one end of the matching capacitor is electrically connected to one end of the inductive antenna;
    a first phase-inverting unit, wherein an output end of the first phase-inverting unit is electrically connected to the other end of the matching capacitor, and an input end of the first phase-inverting unit is electrically connected to an output end of the second phase-inverting circuit; and
    a second phase-inverting unit, wherein an output end of the second phase-inverting unit is electrically connected to the other end of the inductive antenna, and an input end of the second phase-inverting unit is electrically connected to an input end of the second phase-inverting circuit.

4. The magneto-electric-induction conversion system of a wireless input device according to claim 3, wherein the first phase-inverting unit comprises at least one inverter.

5. The magneto-electric-induction conversion system of a wireless input device according to claim 3, wherein the second phase-inverting unit comprises at least one inverter.

6. The magneto-electric-induction conversion system of a wireless input device according to claim 1, wherein when a plurality of parallel-connected resonant circuits exists, the parallel-connected resonant circuits are sequentially connected in series.

7. The magneto-electric-induction conversion system of a wireless input device according to claim 1, wherein each parallel-connected resonant circuit comprises an inductive antenna and a matching capacitor that are connected in parallel.

8. The magneto-electric-induction conversion system of a wireless input device according to claim 1, wherein the rectifier circuit is a bridge rectifier circuit.

9. The magneto-electric-induction conversion system of a wireless input device according to claim 8, wherein the bridge rectifier circuit comprises a plurality of Schottky diodes.

10. The magneto-electric-induction conversion system of a wireless input device according to claim 1, wherein the first phase and the second phase are opposite to each other.

11. A magneto-electric-induction conversion emitter of a wireless input device, comprising:
    an oscillation circuit, for generating an oscillation signal by oscillating at a specific frequency;
    a first phase-inverting circuit, connected to the oscillation circuit in series, for inverting the oscillation signal and outputting a first AC signal having a first phase;
    a second phase-inverting circuit, connected to the first phase-inverting circuit in series, for inverting the first AC signal and outputting a second AC signal having a second phase; and
    at least two serially-connected resonant circuits, arranged side by side, wherein each serially-connected resonant circuit is connected to the second phase-inverting circuit in parallel, for receiving the first AC signal and the second AC signal, and generating an electromagnetic wave according to the first AC signal and the second AC signal.

12. The magneto-electric-induction conversion emitter of a wireless input device according to claim 11, wherein the oscillation circuit is a quartz oscillation circuit.

13. The magneto-electric-induction conversion emitter of a wireless input device according to claim 11, wherein each serially-connected resonant circuit comprises:
    an inductive antenna;

a matching capacitor, wherein one end of the matching capacitor is electrically connected to one end of the inductive antenna;

a first phase-inverting unit, wherein an output end of the first phase-inverting unit is electrically connected to the other end of the matching capacitor, and an input end of the first phase-inverting unit is electrically connected to an output end of the second phase-inverting circuit; and a second phase-inverting unit, wherein an output end of the second phase-inverting unit is electrically connected to the other end of the inductive antenna, and an input end of the second phase-inverting unit is electrically connected to an input end of the second phase-inverting circuit.

14. The magneto-electric-induction conversion emitter of a wireless input device according to claim 13, wherein the first phase-inverting unit comprises at least one inverter.

15. The magneto-electric-induction conversion emitter of a wireless input device according to claim 13, wherein the second phase-inverting unit comprises at least one inverter.

16. The magneto-electric-induction conversion emitter of a wireless input device according to claim 11, wherein the first phase and the second phase are opposite to each other.

17. A magneto-electric-induction conversion receiver of a wireless input device, comprising:

at least two parallel-connected resonant circuits, wherein the parallel-connected resonant circuits are mutually connected in series, for generating an AC signal in response to an electromagnetic wave; and a rectifier circuit, for converting the AC signal into a DC signal, and outputting the DC signal.

18. The magneto-electric-induction conversion receiver of a wireless input device according to claim 17, wherein each parallel-connected resonant circuit comprises an inductive antenna and a matching capacitor that are connected in parallel.

19. The magneto-electric-induction conversion receiver of a wireless input device according to claim 17, wherein the rectifier circuit is a bridge rectifier circuit.

20. The magneto-electric-induction conversion receiver of a wireless input device according to claim 19, wherein the bridge rectifier circuit comprises a plurality of Schottky diodes.

* * * * *